United States Patent
Kim et al.

(10) Patent No.: US 8,228,881 B2
(45) Date of Patent: Jul. 24, 2012

(54) SYSTEM AND METHOD FOR PROVIDING LOCATION INFORMATION

(75) Inventors: Joo-Young Kim, Suwon-si (KR); Jae-Kwon Oh, Seoul (KR); Wuk Kim, Gwacheon-si (KR)

(73) Assignee: Samsung Electronics Co., Ltd (KR)

( * ) Notice: Subject to any disclaimer, the term of this patent is extended or adjusted under 35 U.S.C. 154(b) by 1007 days.

(21) Appl. No.: 12/195,811

(22) Filed: Aug. 21, 2008

(65) Prior Publication Data
US 2009/0052422 A1 Feb. 26, 2009

(30) Foreign Application Priority Data
Aug. 21, 2007 (KR) .................. 10-2007-0083888

(51) Int. Cl.
*G06F 15/16* (2006.01)

(52) U.S. Cl. ..... 370/338; 370/331; 370/328; 455/456.1; 455/418; 455/517; 709/225; 709/229; 709/228

(58) Field of Classification Search .................. 370/338
See application file for complete search history.

(56) References Cited

U.S. PATENT DOCUMENTS

| | | | | |
|---|---|---|---|---|
| 7,089,301 | B1* | 8/2006 | Labio et al. | 709/224 |
| 7,395,336 | B1* | 7/2008 | Santharam et al. | 709/227 |
| 2004/0157620 | A1 | 8/2004 | Nyu | |
| 2006/0120320 | A1* | 6/2006 | Shim | 370/328 |
| 2010/0274916 | A1* | 10/2010 | Lin | 709/230 |

FOREIGN PATENT DOCUMENTS

EP  1 480 408  5/2003

* cited by examiner

*Primary Examiner* — Jeffrey Pwu
*Assistant Examiner* — Sulaiman Nooristany
(74) *Attorney, Agent, or Firm* — The Farrell Law Firm, P.C.

(57) ABSTRACT

Disclosed is a method for providing location information of a terminal by using an Session Initiation Protocol (SIP). To this end, a location request and a location estimate are transferred between terminals by using messages used in the SIP. In particular, it is possible to receive location information of a counterpart during communication, or transfer the location information of its own to a counterpart, in consideration of the fact that real-time voice service mainly uses the SIP. Moreover, it is possible to request and transmit location information on using multimedia services. Therefore, a terminal or a server using the SIP easily uses location information, so that it is possible to provide new services inter-working with location services.

20 Claims, 10 Drawing Sheets

SYSTEM AND METHOD FOR PROVIDING LOCATION INFORMATION

PRIORITY

This application claims priority under 35 U.S.C. §119(a) to an application entitled "System And Method For Providing Location Information" field in the Korean Industrial Property Office on Aug. 21, 2007 and assigned Serial No. 2007-83888, the contents of which are hereby incorporated by reference.

BACKGROUND OF THE INVENTION

1. Field of the Invention

The present invention relates to a system and a method for providing location information, and more particularly to a system and a method for providing location information of a terminal by using a Session Initiation Protocol (SIP).

2. Description of the Related Art

A Session Initiation Protocol (SIP) is a standard Voice over IP (VOIP) protocol released by the Internet Engineering Task Force (IETF), which generates and terminates a multimedia session between multiple terminals over an IP network, as does the H.323 protocol. Particularly, in order to transfer real-time voice service, moving pictures, texts, and pictures between terminals over an IP network, the SIP is used for exchange of information, such as inter-terminal capability, codec decision and network resource reservation.

The SIP is used for an SIP session establishment, which may be accomplished by completing reservation of network resources after decision of a data path and a codec which is to be used between the terminals. On an established SIP session, real-time voice and multimedia services are provided.

The above-described SIP is used for resource reservation for real-time voice and multi-media services between terminals, for codec decision, etc. Such SIP-based services typically include only real-time voice services and multi-media services, but no particular method has been provided to expand the SIP to be applied to other services. For example, when location information of a terminal is simultaneously provided during voice communication, it is possible to provide real-time voice services and multi-media services at an improved level.

SUMMARY OF THE INVENTION

Accordingly, the present invention has been made to solve the above-mentioned problems occurring in the prior art, and the present invention provides a system and a method for providing terminal's location by using an SIP.

In accordance with an aspect of the present invention, there is provided a system for providing location information of a terminal by using an Session Initiation Protocol (SIP), the system including a first terminal for transmitting an SIP message for call connection; a second terminal for determining if the SIP message includes a location request when the SIP message for call connection is received from the first terminal, and transmitting a response message including location information of the second terminal when the received SIP message includes the location request; and an SIP core for transferring the SIP message for call connection from the first terminal to the second terminal, and transferring the response message from the second terminal to the first terminal.

In accordance with another aspect of the present invention, there is provided a system for providing location information, the system including a first terminal for transmitting an SIP message for call connection including a location request; and a second terminal for establishing a session with the first terminal, and transmitting a transmission message including location information of the second terminal on the established session to the first terminal when the SIP message for call connection is received.

In accordance with another aspect of the present invention, there is provided a system for providing location information, the system including a first terminal for transmitting a message including location information of the first terminal to a second terminal when a response message is received from the second terminal, wherein the message is to be transmitted on a session; and a second terminal for transmitting the response message including a location request, with respect to an SIP message for call connection.

In accordance with another aspect of the present invention, there is provided a system for providing location information, the system including: a first terminal for transmitting an SIP message for call connection including location information of the first terminal; and a second terminal for receiving the SIP message for call connection and acquiring the location information of the first terminal.

In accordance with another aspect of the present invention, there is provided a method for providing location information of a terminal by using an SIP, the method including transmitting, by a first terminal, an SIP message for call connection to a second terminal; determining, by the second terminal, if the received SIP message includes a location request; and transmitting a response message including location information of the second terminal to the first terminal when the received SIP message includes a location request.

In accordance with another aspect of the present invention, there is provided a method for providing location information, the method including transmitting, by a first terminal, an SIP message for call connection including a location request to a second terminal; transmitting, by the second terminal, a response message to the first terminal and establishing a session; and transmitting, by the second terminal, a message including location information of the second terminal to the first terminal, wherein the message is to be transmitted on the established session.

In accordance with another aspect of the present invention, there is provided a method for providing location information of a terminal by using an SIP, the method including transmitting, by a first terminal, an SIP message for call connection to a second terminal; receiving, by the first terminal, a response message with respect to the SIP message for call connection from the second terminal; determining if the received response message includes a location request; and transmitting a response message including the location request of the first terminal to the second terminal when the received response message includes the location request.

In accordance with another aspect of the present invention, there is provided a method for providing location information, the method including transmitting, by a first terminal, an SIP message for call connection to a second terminal; transmitting, by the second terminal, a response message to the first terminal, and establishing a session; transmitting, by the first terminal, a message including a location request to the second terminal, wherein the message is to be transmitted on the established session; and transmitting, by the second terminal that, a message including the location information of its own to the first terminal, wherein the message is to be transmitted on the established session.

In accordance with another aspect of the present invention, there is provided a method for providing location information, the method including transmitting, by a first terminal, an SIP message for call connection to a second terminal; transmitting, by the second terminal, a response message to the first terminal, and establishing a session; transmitting, by the second terminal, a message including a location request to the second terminal, wherein the message is to be transmitted on the established session; and transmitting, by the first terminal, a message including the location information of its own to the second terminal, wherein the message is to be transmitted on the established session.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENT

Figure 1:
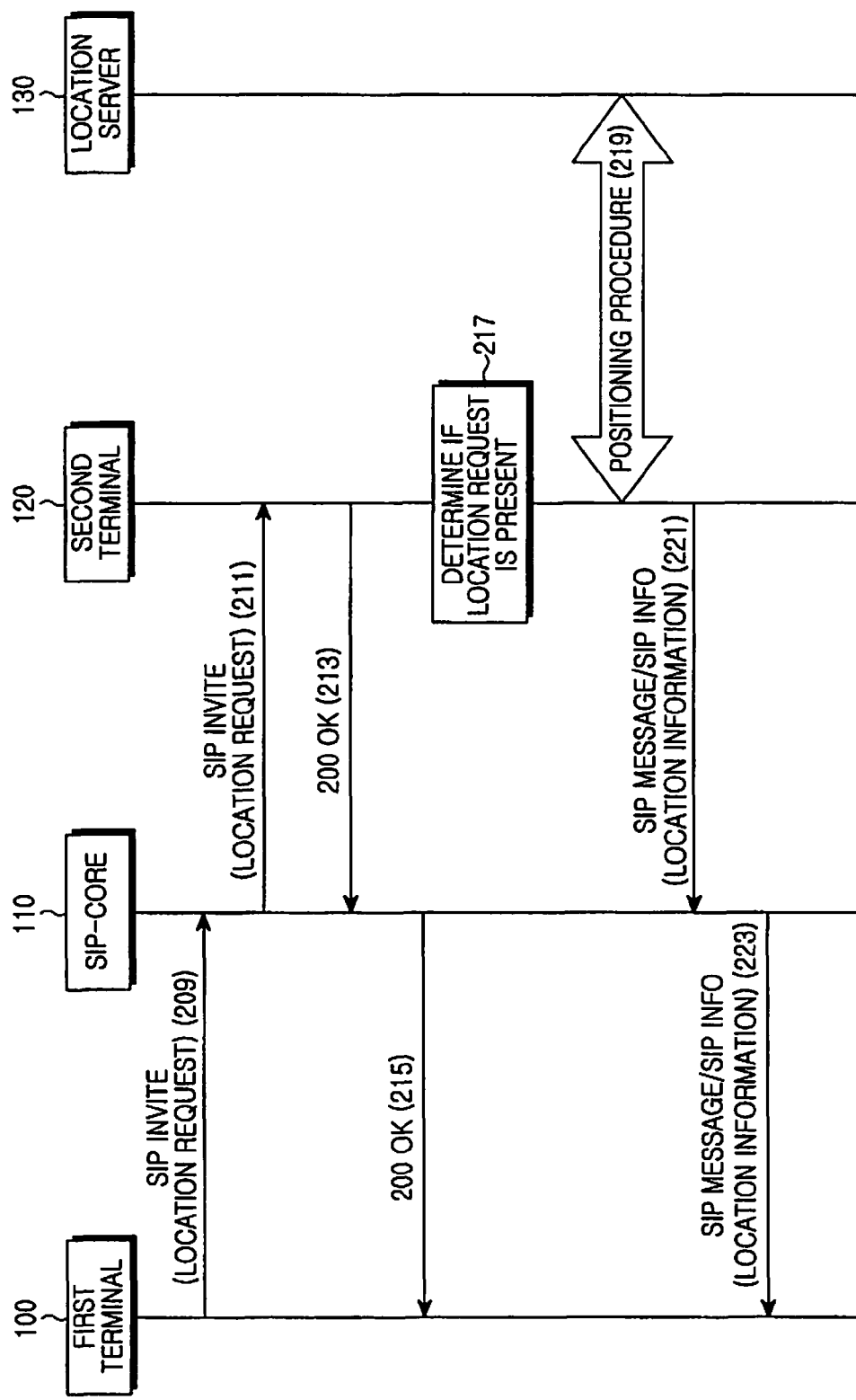
FIG. 1 is a flow diagram illustrating SIP messages transmitted/received between entities for providing location information according to a first embodiment of the present invention.

Hereinafter, preferred embodiments of the present invention will be described with reference to the accompanying drawings. It should be noted that similar reference numerals and characters denote corresponding features consistently throughout the attached drawings. In the following description of the present invention, a detailed description of known functions and configurations incorporated herein will be omitted when it may make the subject matter of the present invention rather unclear.

The present invention provides a method for providing location information of a terminal by using an SIP. To this end, according to the present invention, a location request and a location estimate are transferred between terminals by using messages used in the SIP. In particular, the present invention provides a method for receiving location information of a counterpart during communication and transferring the location information of its own to the counterpart, in consideration of the fact that a main service using an SIP is a real-time voice service (VoIP). Moreover, the present invention provides a method for requesting and transmitting location information when multi-media services are used. As such, a terminal or a server using the SIP can easily obtain location information, so that it is possible to provide new services inter-working with location services.

Before the description of the preferred embodiments, messages used in the SIP according to the present invention will now be described.

In the present invention, it is assumed that there exist two terminals trying to establish an SIP session. The SIP messages may be classified into two types of messages.

The first type of message is a request message generated by a terminal that makes a request for an SIP session, and the second type of message is a response message of a terminal that receives the request for the SIP session. In the present invention, a terminal making a request for the SIP session is defined as a caller, and a terminal receiving the request for the SIP request is defined as a callee.

An SIP INVITE is used as the request message, which is a message transmitted from the caller to the callee via an SIP core when an SIP session is initiated, i.e. when a call is generated, and is used for the call setup. In the present invention, a request for location information may be inserted into the body part of the SIP INVITE in order to make a request for location information of the callee.

An Acknowledgment (ACK) message is used as a response message, and may be returned in response to an SIP INVITE or a final response message for an SIP INVITE. Such an ACK message is a message returned with respect to a final response for the SIP INVITE regardless of whether the response is a success or a failure.

A 200 OK message is also used as a response message, and is a success message indicating that, when the SIP INVITE is received, the SIP INVITE has been successfully received. When the caller transmits the SIP INVITE, and then receives the 200 OK message in response to the SIP INVITE, an SIP session is established between the caller and the callee.

Meanwhile, entities constituting the system for providing location information according to the present invention are divided into four types of entities. The system includes a terminal for making a request for an SIP session, a terminal for receiving the request for the SIP session, an SIP core, and a location server. First, the SIP core transfers the SIP messages between the terminals. Therefore, the SIP core exists between the caller and the callee, and transfers the exchanged messages to a corresponding target terminal. The role and function of the SIP core is similar to operation of a general SIP system, so that the detailed description thereof will be omitted. The location server, which is used in calculating terminal's location, refers to a general location server, the type of which is not limited in the present invention.

The operation of the terminal for receiving the request for the SIP session and the terminal for making a request for the SIP session will now be described in more detail.

Hereinafter, each preferred embodiment of the present invention will be described. In particular, how to load location request and location information on messages used in the SIP, i.e. SIP messages, will be described with respect to each of the preferred embodiments.

Among the preferred embodiments, methods for requesting and transferring location information during, and after the SIP session establishment are provided respectively.

The method for requesting and receiving location information during the SIP session establishment uses SIP messages, e.g. an SIP INVITE. a 200 OK message, an ACK message, and so on, when the SIP session establishment is provided.

The method for requesting and transferring location information after the SIP session establishment may use SIP messages used for data transfer, e.g. an SIP message, an SIP INFO, an SIP SUBSCRIBE, an SIP NOTIFY, etc., other than the message used for the SIP session connection. Alternatively, the method for requesting and transferring location information may use a Message Session Relay Protocol (MSRP) used to exchange data between two target terminals. Herein, the SIP MESSAGE written in capital letters is one of the SIP messages.

In a first embodiment of the present invention, the request for location information is loaded on the SIP INVITE for call connection during the SIP session establishment, and then the location information is transferred through the SIP message or the SIP INFO.

Hereinafter, the flow diagram of the SIP messages transmitted/received between entities for providing location information according to the first embodiment of the present invention will be described with reference to FIG. 1. FIG. 1 shows a process in which a first terminal 100 (i.e. a caller) wishing to open an SIP session makes a request for location information to a second terminal 120 (i.e. a callee) and then receives the requested location information of the callee.

Referring to FIG. 1, the first terminal 100 transmits an SIP INVITE for call connection to the SIP core in step 209, and finally transfers the SIP INVITE via the SIP core 110 to the second terminal 120 in step 211. Herein, the second terminal 120 initiates an SIP session together with the first terminal 100, and is a target terminal having location information which the first terminal 100 desires to acquire. In this case, the SIP INVITE includes the request for location information of the callee. Table 1 below shows an example of the SIP INVITE format.

TABLE 1

INVITE sip:callee@example.com SIP/2.0
Via: SIP/2.0/UDP pc33.example.com;branch=z9hG4bKnashds8
Max-Forwards: 70
To: callee <sip:callee@example.com>
From: caller <sip:caller@example.com>;tag=1928301774
Call-ID: a84b4c76e66710
CSeq: 314159 INVITE
Contact: <sip:ue1 @pc33.example.com>
Content-Type :multipart/mixed ;boundary=position1
Content-Length:256
--position 1
Contents-Type:application/sdp
v=0
o=ue1 283490293 283490293 IN IPv4 pc33.example.com
s=VoIP
c=IN IPv6 10.10.10.10
t=0 0
m=audio 5000, RTP/AVP 0
a=rtpmap :0 PCMU/8000
--position 1
Content-Type: application/xml
Content-Length: 142

As shown in Table 1, the SIP INVITE format is divided into three paragraphs, wherein the first paragraph corresponds to a header part, and the remaining parts correspond to body parts. In the header part, a Uniform Resource Identifier (URI), such as "callee@example.com" indicates a target for receiving the SIP INVITE. A session ID is set in "Call-ID," and it has the same value when the same SIP session is used regardless of pre-connection and post-connection of the SIP session. The second paragraph corresponding to the body part is a part of a call connection, request, and the third paragraph is a part of location information request. The part of the location information request among these parts indicates that the request condition type is an eXtensive Markup Language (XML). In the present invention, there is described an example where a standard location immediate request of an Open Mobile Alliance Mobile Location Protocol (OMA MLP) expressed in an XML is used. Furthermore, contents, which are expressed in a text, an Session Description Protocol (SDP), and an XML, used to make a request for location information of the target terminal may be included in the body part of the SIP INVITE.

The location request condition expressed in an XML may be represented as defined by Table 2 below.

TABLE 2

```
<?xml version="1.0" ?>
<!DOCTYPE svc_init SYSTEM "MLP_SVC_INIT_320.DTD">
<svc_init ver="3.2.0">
<hdr ver="3.2.0">
 <client>
   <id>theasp</id>
   <pwd>thepwd</pwd>
   <serviceid>0005</serviceid>
   <requestmode type="PASSIVE"/>
 </client>
<requestor>
   <id>theoriginalasp</id>
   <serviceid>0005</serviceid>
 </requestor>
</hdr>
<slir ver="3.2.0" res_type="SYNC">
 <msids>
   <msid type="IPV4">93.10.0.250</msid>
   <msid_range>
    <start_msid>
      <msid>461018765710</msid>
    </start_msid>
    <stop_msid>
      <msid>461018765712</msid>
    </stop_msid>
   </msid_range>
 <msid type="ASID">441728922342</msid>
   <msid_range>
    <start_msid>
      <msid>461018765720</msid>
    </start_msid>
    <stop_msid>
      <msid>461018765728</msid>
    </stop_msid>
   </msid_range>
 </msids>
 <eqop>
   <resp_req type="LOW_DELAY" />
   <hor_acc>1000</hor_acc>
 </eqop>
 <geo_info>
   <CoordinateReferenceSystem>
    <Identifier>
      <code>4004</code>
      <codeSpace>EPSG</codeSpace>
      <edition>6.1</edition>
    </Identifier>
   </CoordinateReferenceSystem>
```

TABLE 2-continued

```
    </geo_info>
    <loc_type type="CURRENT_OR_LAST" />
    <prio type="HIGH" />
  </slir>
</svc_init>
```

As shown in Table 2, the "<client>" tag indicates the identity of the terminal for requesting location information of the target terminal. The "<client>" tag corresponds to an ID of the caller in the present invention. Moreover, the "<msids>" tag indicates the identity of the target terminal, location information of which is required to be obtained. In the present invention, the "<msids>" tag corresponds to an ID of the callee.

Furthermore, the SIP INVITE includes the following conditions, for use of the location information request.

First, the SIP INVITE includes requester information for requesting location information, and the requester information used in the present invention corresponds to information of a caller terminal that sends the SIP INVITE message. The requester information includes a requesting terminal ID, a requesting application program ID, a requester's ID, and so on. Such requester information is used for authorization for the location information request.

Moreover, the SIP INVITE includes information of the target terminal, that is, an ID of the target terminal. In this case, the ID of the target terminal is given in a form in which the caller terminal and the callee terminal can recognize. In addition to the above-described conditions, conditions required on calculating position estimate are necessary. For example, the conditions include requirements for accuracy of the location estimate, i.e. Quality of Position, and a priority for the location estimate process. Further, the conditions include the number of times of the location estimate report, e.g. one-time report, or at least one-time report, a time interval of the location estimate report, e.g. report per one hour, etc. In the present invention, description is made of only the basic conditions required for the location request, but various conditions and information associated with the location request may be included in the SIP INVITE.

When receiving the above-described SIP INVITE format, the second terminal 120 authenticates the first terminal 100, and then performs authorization, by using the SIP INVITE. This is identical to the method used in a general SIP-based system, so a detailed description thereof is omitted. After competing the authentication and the authorization, the second terminal 120 transmits a 200 OK message to the SIP core 110, in response to the SIP INVITE corresponding to the request for the SIP session, in step 213. In step 215, the SIP core 110 transfers the 200 OK message to the first terminal 100.

Thereafter, the second terminal 120 checks the body part of the SIP INVITE in order to determine if there is a request for the location information in step 217. In this case, a standard location immediate request of the Open Mobile Alliance Mobile Location Protocol (OMA MLP) is used as an example used to make a request for location calculation in the present invention. Therefore, the second terminal 120 should use the OMA MLP. When the location information request is included, the second terminal 120 confirms if its own location information has been previously stored. When the location information is pre-stored and the conditions, for example the accuracy, required by the first terminal 100 are satisfied, the second terminal 120 proceeds to step 221 without performing step 219. In contrast, when there is no pre-stored location information, the second terminal 120 performs a positioning procedure together with the location server 130. In this case, the location server 130 should know the SIP in order to inter-work with the second terminal 120. The method for calculating the location information variously depends on types and capabilities of communication networks, such as CDMA, WCDMA, GSM, WLAN, WIMAX, that are connected to the location calculation capability of the second terminal 120. Therefore, the present invention covers all of the existing technologies for the method of location calculation, and the detailed description thereof follows standards of corresponding technologies without any modification. For example, an OMA Secure User Plane Location (SUPL) may be used for location calculation. The description of the process in which a terminal calculates location is omitted in the present invention.

In step 221, the second terminal 120 inserts its own location information into the SIP MESSAGE or the SIP INFO in order to transmit the of its own location information, obtained by the above-described method, to the first terminal 100, and then transmits the SIP MESSAGE or the SIP INFO with the location information of its own to the SIP core 110. In step 223, the SIP core 110 transmits the SIP MESSAGE or the SIP INFO containing the location information of the second terminal 120 to the first terminal 100. Such location information includes information of the target terminal which the first terminal 110 desires to know, including an ID of the target terminal, position estimate of the target terminal, information for accuracy of a position estimate, and a time when position estimate is calculated. In this case, the position estimate may be expressed by values of latitude and longitude, by geographical names such as civic addresses, or by cell information on a network.

Meanwhile, Table 3 below shows an example of a format in which the SIP MESSAGE includes location information of the second terminal (that is, location information of the callee).

TABLE 3

```
MESSAGE sip: caller@example.com SIP 2.0
Via:SIP/2.0/TCP pc34.example.com; branch=z9hg4bknashds8
MAX-Forward: 7015
To:caller@example.com; tag=123aa9
From:calee@example.com; tag=xyzygg
Call-ID: a84b4c76e66710
Cseq:1 MESSAGE
Contact: sip:ue2@pc34.example.com
Content-Type:xml
Content-Length:256
<pos>
    <msid>calLee@example.com</msid>
    <pd>
        <time>20020813010423</time>
        <shape>
            <CircularArea srsName="www.epsg.org#4326">
                <coord>
                    <X>30 45 35.41N</X>
                    <Y>45 32 55.02E</Y>
                </coord>
                <radius>15</radius>
            </CircularArea>
        </shape>
    </pd>
</pos>
```

As shown in Table 3, the URI "caller@example.com" indicates a target for receiving the SIP MESSAGE. In the present invention, the SIP MESSAGE may have an ID of the caller, that is, an ID of the first terminal 100, inserted therein. The same session ID is set in "Call-ID", as in the case of Table 1, in order to indicate that the SIP MESSAGE uses the same SIP session. Further, the string "xml" indicates that location information of the target terminal, i.e. second terminal 120, is included in the form of an xml. Furthermore, the URI "calee@example.com" indicates an ID of the target terminal. In the present invention, the SIP MESSAGE may have an ID of the callee, i.e. an ID of the second terminal 120, inserted therein.

In the above-described first embodiment of the present invention, a description has been made of a case where the first terminal 100 requests the second terminal 120 to provide its location information.

Figure 2:
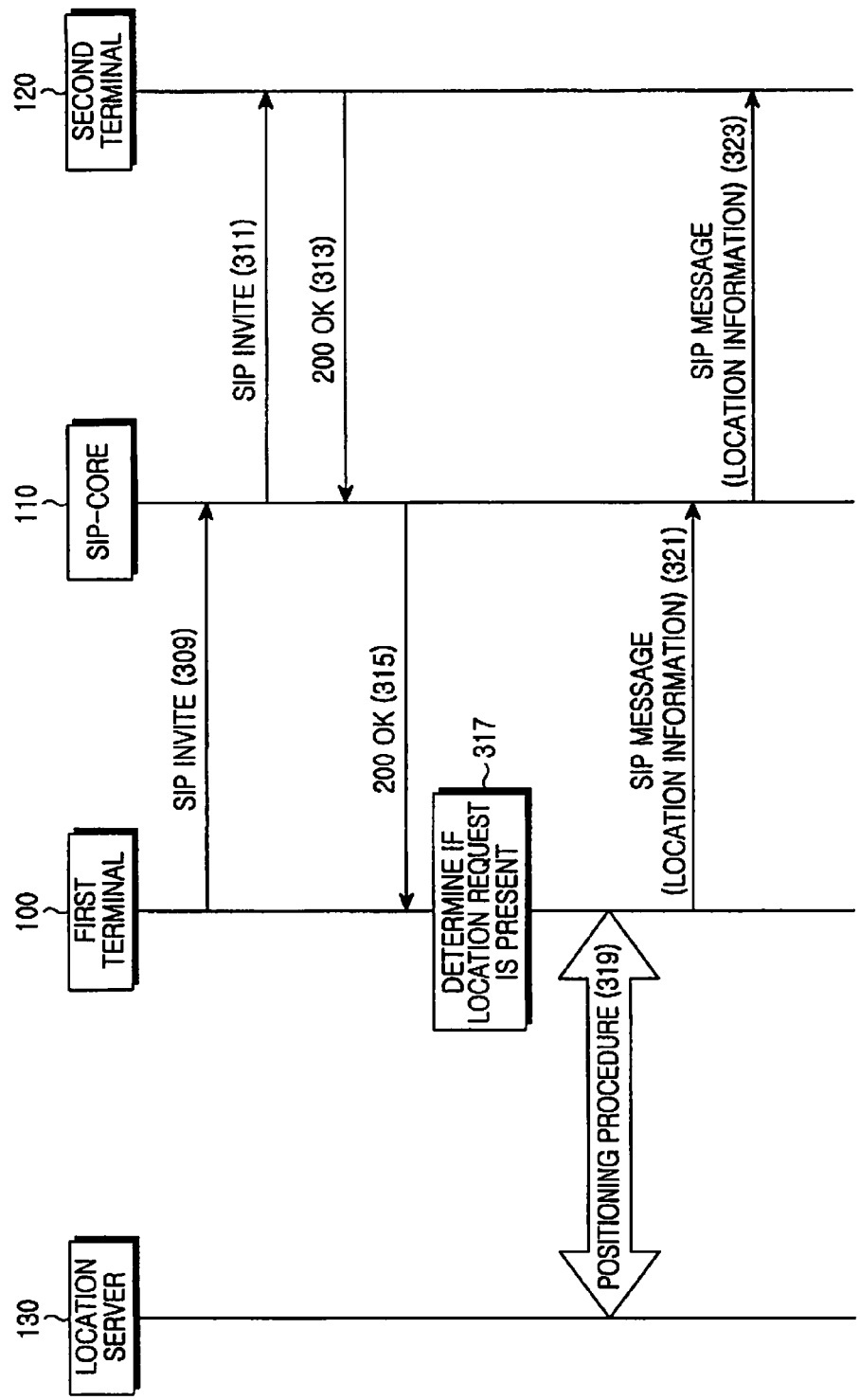
FIG. 2 is a flow diagram illustrating SIP messages transmitted/received between entities for providing location information according to a second embodiment of the present invention.

In the second embodiment of the present invention, with reference to FIG. 2, a description is made of a case where the first terminal 100 may make a request for the SIP session while directly transferring its own location information to the second terminal 120. FIG. 2 illustrates a case where the first terminal 100 transfers its own location information to a desired counterpart.

Referring to FIG. 2, the first terminal 100 transmits the SIP INVITE for requesting an SIP session establishment to the SIP core 110 in step 309. In this case, the SIP INVITE is a message usually used for SIP session connection. In step 311, the SIP core 110 transfers the SIP INVITE to the second terminal 120. Since steps 313 and 315 are identical to steps 213 and 215, the detailed description thereof is omitted.

Meanwhile, when receiving the 200 OK message, the first terminal 100 determines if there is a request for transferring its own location information to the second terminal 120, i.e. the callee, or a third terminal in step 317. This request may be accomplished by an internal application program. For example, the request for transferring the location information may occur either when location information of a terminal is transferred during a multimedia message transmission, or when location information of caller's terminal is transferred after call connection during an emergency call.

When the first terminal 100 determines that there is the request for transferring location information, the first terminal 100 determines if its own location information is present within the terminal. Since the location information is present in a storage device of the terminal, the first terminal 100 checks the contents of the storage device. When location information of the first terminal 100 is found, the first terminal 100 proceeds to step 321 without performing step 319. In contrast, when location information of the first terminal 100 is not found, the first terminal 100 proceeds to step 319, which is identical to step 219 of FIG. 1.

The location information of the first terminal 100 obtained by the above-steps is inserted into the SIP MESSAGE or the SIP INFO and is transmitted to the SIP core 110 in step 321. In step 323, the SIP MESSAGE or the SIP INFO with the location information of the first terminal 100 is transferred to the second terminal 120 via the SIP core 110. In this case, the format in which location information is loaded on the SIP MESSAGE is similar to that of Table 3. In the case of use of the SIP INFO, the SIP INFO has the format in which the location information is inserted into a body part, as in the case of the SIP MESSAGE.

In the first and the second embodiments of the present invention, location information is transferred by using the SIP MESSAGE or the SIP INFO after SIP session connection. The fact that the 200 OK message is transferred to the first terminal 100 implies that the SIP session is established. Therefore, in the first and second embodiments of the present invention, descriptions have been made of a case where the location information is transferred after the SIP session connection. However, in the case of the SIP MESSAGE, location information may be transferred to a counterpart regardless of SIP session connection. As a result, the location information according to the second embodiment of the present invention may be not transferred during SIP session connection and may be transferred after, or before SIP session connection.

In a third embodiment of the present invention, a description is made of a method in which the first terminal 100 loads and transmits location request on the SIP INVITE during an SIP session connection, and the second terminal 120 loads and transfers the location information on a 200 OK message or an ACK message corresponding to a response message of the SIP INVITE.

Figure 3:
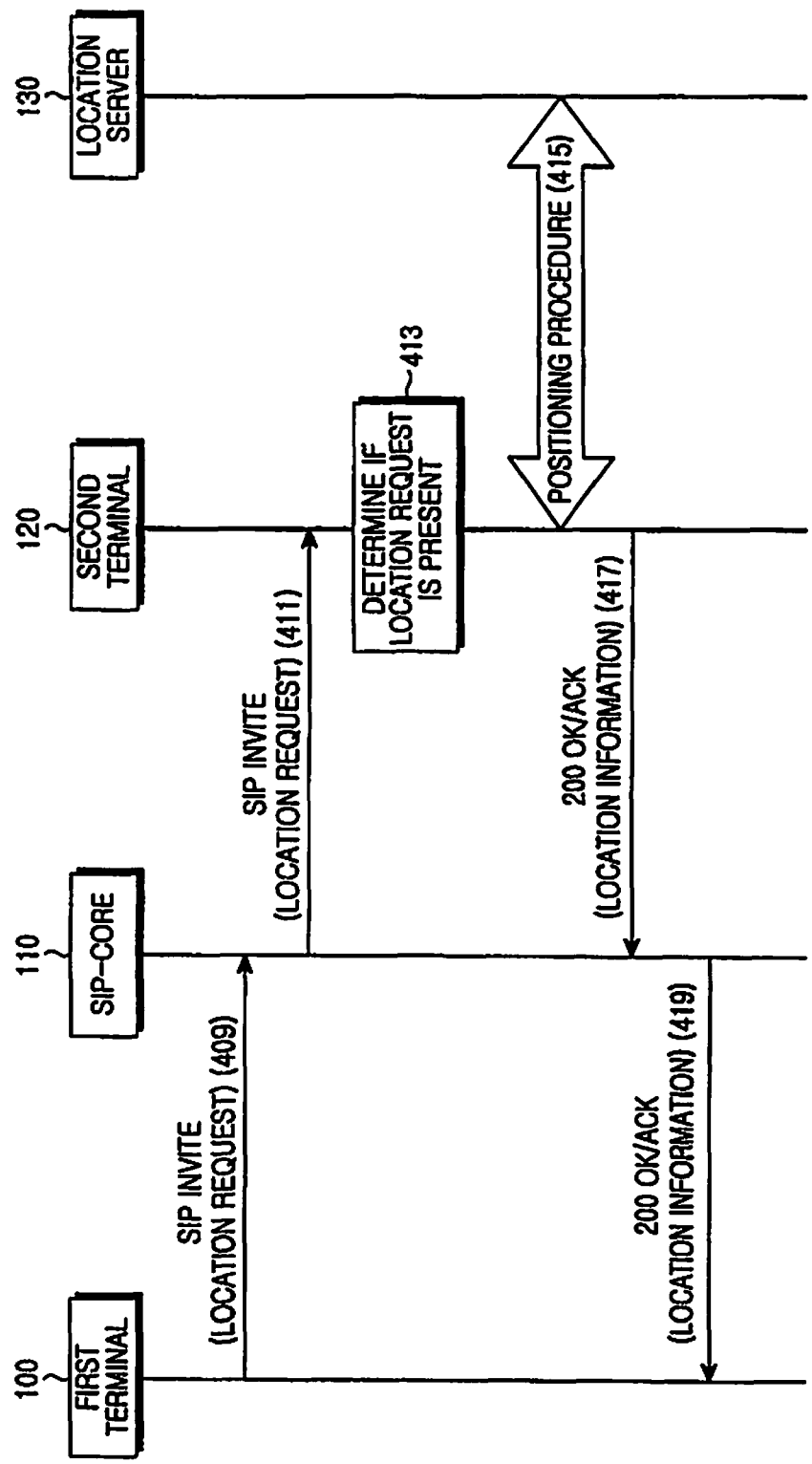
FIG. 3 is a flow diagram illustrating SIP messages transmitted/received between entities for providing location information according to a third embodiment of the present invention.

Referring to FIG. 3, steps 409 and 411 are identical to steps 209 and 211 of FIG. 1, and steps 413 and 415 are identical to steps 217 and 219 of FIG. 1.

When the second terminal 120 loads its own location information on the 200 OK message or the ACK message used for a response message of the SIP INVITE and transmits the resulting message to the SIP core 110, the SIP core 110 transfers the resulting message to the first terminal 100 in step 419. That is, the location information is simultaneously transferred to a counterpart that requests the location information during an SIP session establishment.

Table 4 below shows an example of a format in which location information of the second terminal (i.e. location information of a callee) is inserted into the 200 OK message.

TABLE 4

SIP/2.0 200 OK
Via: SIP/2.0/UDP pc33.example.com;branch=z9hG4bKnashds8
;received=192.0.2.8
From: sip:caller@example.com;tag=123aa9
To: sip:callee@example.com;tag=xyzygg
Call-ID: a84b4c76e66710
CSeq: 314159 INVITE
Contact: sip:ue2@pc34.example.com
Content type: multipart/mixed;boundary=position1
Content-Length:256
--Position1
Content-Type :application/sdp
v=0
o=ue2 283491234 283491234 INIPv4 pc34.example.com
s=voip
c=IN IPv4 20.20.20.20
t=0 0
m=audio 20000, RTP/AVP 0
a=rtpmap:0 PCMU/8000
--position1
Contents-Type:application/xml
Contents-Description : the position estimate
<pos>
    <msid>caller@example.com</msid>
    <pd>
      <time>20020813010423</time>
      <shape>
        <CircularArea srsName="www.epsg.org#4326">
          <coord>
            <X>30 45 35.41N</X>
            <Y>45 32 55.02E</Y>
          </coord>
          <radius>15</radius>
        </CircularArea>
      </shape>
    </pd>
</pos>

As shown in Table 4, when the 200 OK message uses the same SIP session, the same session ID is set in a part of "Call-ID". In the third paragraph of Table 4, a part of location information request is indicated, wherein the URI "caller@example.com" indicates an ID of a target terminal receiving location information. In the present invention, the URI "caller@example.com" corresponds to an ID of the first terminal 100, i.e. a caller's terminal.

Figure 4:
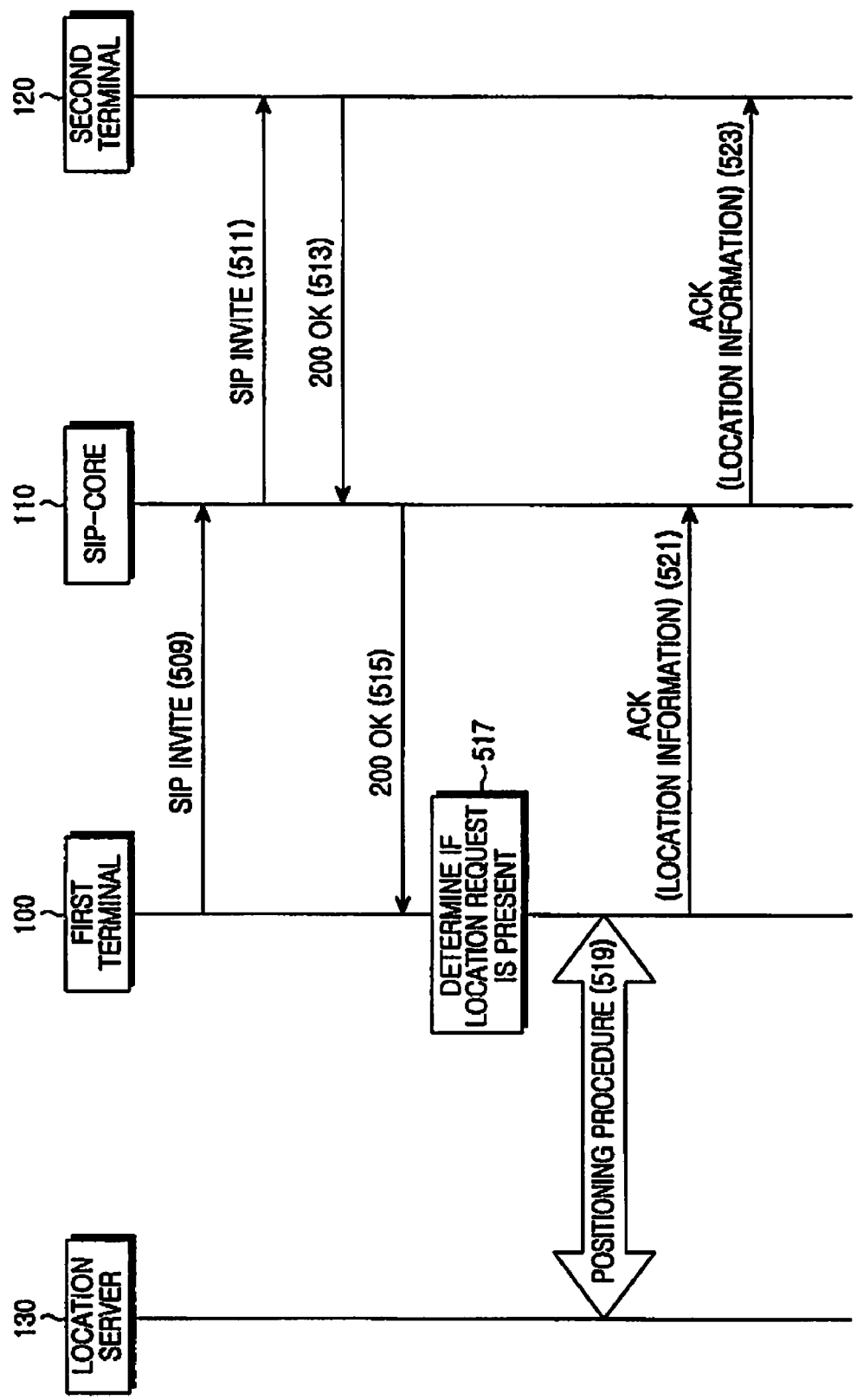
FIG. 4 is a flow diagram illustrating SIP messages transmitted/received between entities for providing location information according to a fourth embodiment of the present invention.

In the fourth embodiment of the present invention, with reference to FIG. 4, a description is made of a case where an ACK message is used when a terminal requesting a SIP session directly provides its own location information to a desired counterpart.

Referring to FIG. 4, steps 509 and 519 are identical to steps 309 and 319 of FIG. 2. Although FIG. 2 shows a case where an SIP MESSAGE is used to transfer location information to a requesting counterpart, FIG. 4 shows a case where an ACK message is used. To this end, when the first terminal 100 transmits the ACK message in response to the 200 OK message in order to transfer its own location information, the first terminal 100 loads and transmits its own location information on the ACK message. Particularly, when the first terminal 100 transmits the ACK message to the SIP core 110 in order to report that the 200 OK message has been received, the first terminal 100 loads and transmits its own location information on the ACK message in step 521. In step 523, the SIP core 110 transfers the ACK message having the location information inserted therein to the second terminal 120, thereby providing the location information of its own to the counterpart.

In the fourth embodiment of the present invention, the description has been made of an example where location information of a caller terminal requesting an SIP session is inserted and transmitted into an ACK message. However, it implies that it can load the location information of its own on an SIP INVITE for requesting an SIP session, instead of an ACK message. In this case, the fact that the location information is inserted and transferred on the ACK message implies that the location information is transferred simultaneously during an SIP session establishment, so that the processes of the SIP session and location information transfer are performed at the same time.

Table 5 below shows an example of a format in which the location information of a caller, that is, location information of the first terminal, is inserted into an ACK message.

TABLE 5

ACK sip: callee@example.com SIP/2.0
Via:SIP/2.0/UDP caller.example.com;branch= z9hG4bKnashds8
Max-Forwards: 70
To: callee <sip:callee@example.com>
From: caller <sip:ue1@example.com>;tag=1928301774
Call-ID: a84b4c76e66710
CSeq: 314159 ACK
Content-Type: application/xml
Content-Length:256
<pos>
    <msid>caller@example.com</msid>
    <pd>
       <time>20020813010423</time>
       <shape>
          <CircularArea srsName="www.epsg.org#4326">
             <coord>
                <X>30 45 35.41N</X>
                <Y>45 32 55.02E</Y>
             </coord>
             <radius>15</radius>
          </CircularArea>
       </shape>
    </pd>
</pos>

As shown in Table 5, the ACK message is set to have an ID of a callee to which the ACK is finally transferred, and the URI "caller@example.com" indicates an ID of a target terminal that receives the location information. In the present invention, the URI "caller@example.com" corresponds to an ID of the second terminal 120, i.e. a callee terminal.

Figure 5:
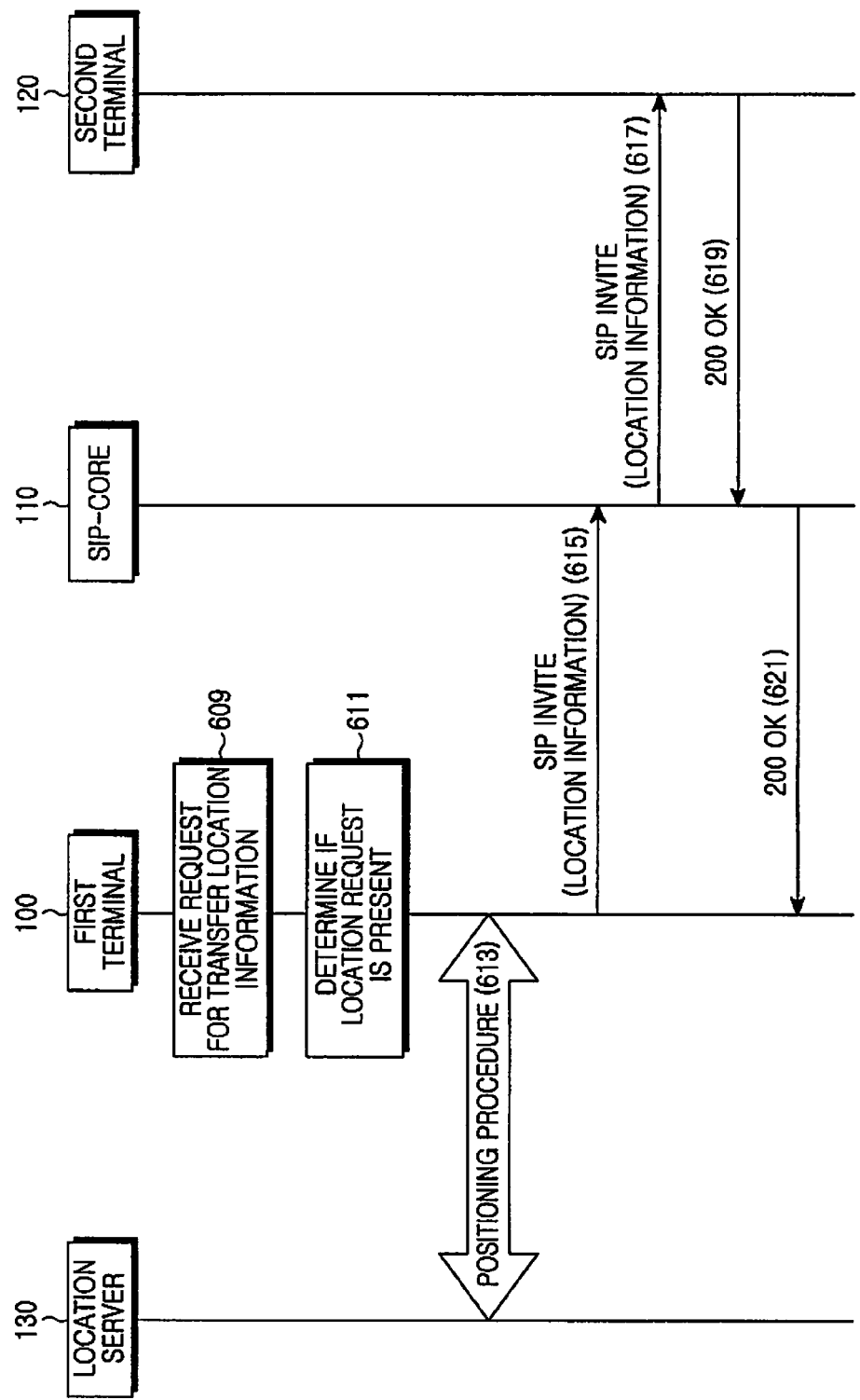
FIG. 5 is a flow diagram illustrating SIP messages transmitted/received between entities for providing location information according to a fifth embodiment of the present invention.

In a fifth embodiment of the present invention, with reference to FIG. 5, a description is made of a case where the location information of its own inserted into the SIP INVITE is transferred to a desired counterpart. FIG. 5 shows a case where the first terminal 100 requesting an SIP session acquires the location information of its own and transfers the acquired location information to the second terminal 120 corresponding to a counterpart. In this case, the first terminal 100 uses the SIP INVITE in order to transfer its own location information to the second terminal 120.

Referring to FIG. 5, the first terminal 100 receives a request for transferring the location information of its own to the counterpart in step 609. In this case, the request may be accomplished by an application program within the first terminal 100 corresponding to a caller. In step 611, the first terminal 100 determines if the location information is present in a storage device within the terminal. As a result of the determination in step 611, when the location information is not stored within the first terminal 100 or new location information of its own is required to be calculated, the first terminal 100 calculates its own location information after being connected to the location server 130 in step 613.

Thereafter, when location information is stored or the new location information is calculated, the first terminal 100 adds the location information to a body part of the first terminal 100, and then transfers the location information to the first terminal 100 in step 615. Then, the SIP core 110 transfers the SIP INVITE to the second terminal 120 corresponding to the caller. After the second terminal 120 receives the SIP INVITE, the second terminal 120 transfers a 200 OK message, indicating that an SIP session is allowed to be established, via the SIP core 110 to the first terminal 100 in steps 619 and 621.

Figure 6:
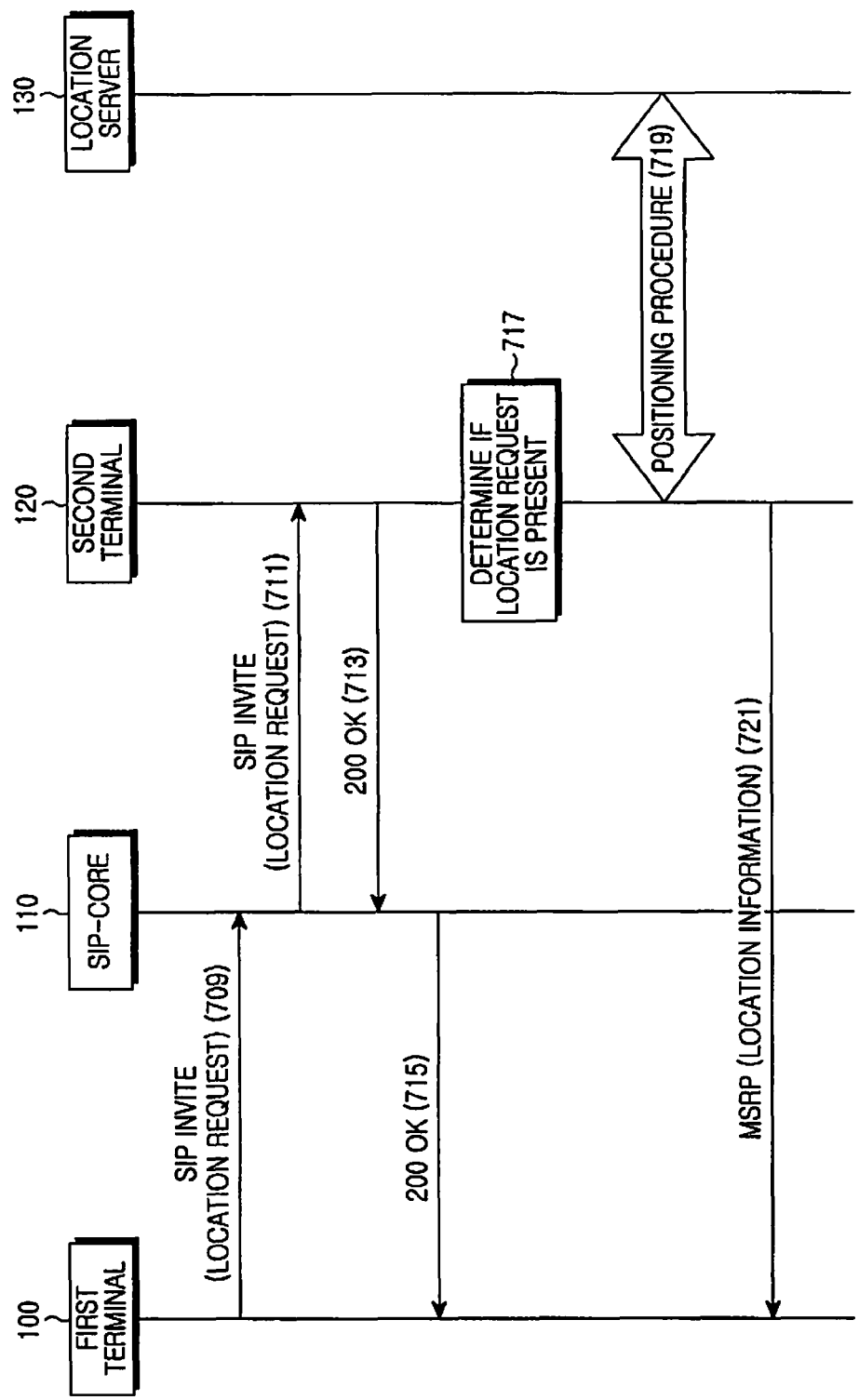
FIG. 6 is a flow diagram illustrating SIP messages transmitted/received between entities for providing location information according to a sixth embodiment of the present invention.

In a sixth embodiment of the present invention, with reference to FIG. 6, a description is made of a case where the location information is requested and transferred regardless of whether the request is made before or after an SIP session establishment. FIG. 6 shows a case where location information is transferred through a route used when two terminals transmit data after the SIP session establishment. In this case, an MSRP is used as a protocol used to request and transfer the location information.

Referring to FIG. 6, steps 709 to 719 of FIG. 6 are identical to steps 209 to 219 of FIG. 1. However, in the sixth embodiment illustrated in FIG. 6, the second terminal 120 loads its own location information on an MSRP-based message instead of an SIP-based message, and transfers the resulting message to the first terminal 100. Such an MSRP-based message is used when mass data is exchanged after SIP session connection. FIG. 6 shows a case where a caller makes a request for location information of a callee, and then receives the requested location information by using the MSRP message. Alternatively, the caller may directly transfer the location information of its own to a callee. In this case, the MSRP message may be used instead of the SIP MESSAGE as illustrated in FIG. 2.

In the sixth embodiment of the present invention, the description has been made of a case where two terminals share a data route used when data is exchanged between the two terminals after SIP session establishment. As such, a route through which the SIP messages are exchanged for SIP session establishment may be different from a route used when two terminals exchange data.

As described above, the description has been made of a case where the caller makes a request for location information and a counterpart of the caller transfers the location information of its own, and a case where the caller directly transfers the location information of its own to the counterpart. Hereinafter, a case where a callee, receiving an SIP INVITE used to make a request for an SIP session, requests location information of the caller, and a case where the callee itself transfers its own location information to the caller will be described. In this case, the callee may make a request for location information without a request for transferring location information from a caller.

Figure 7:
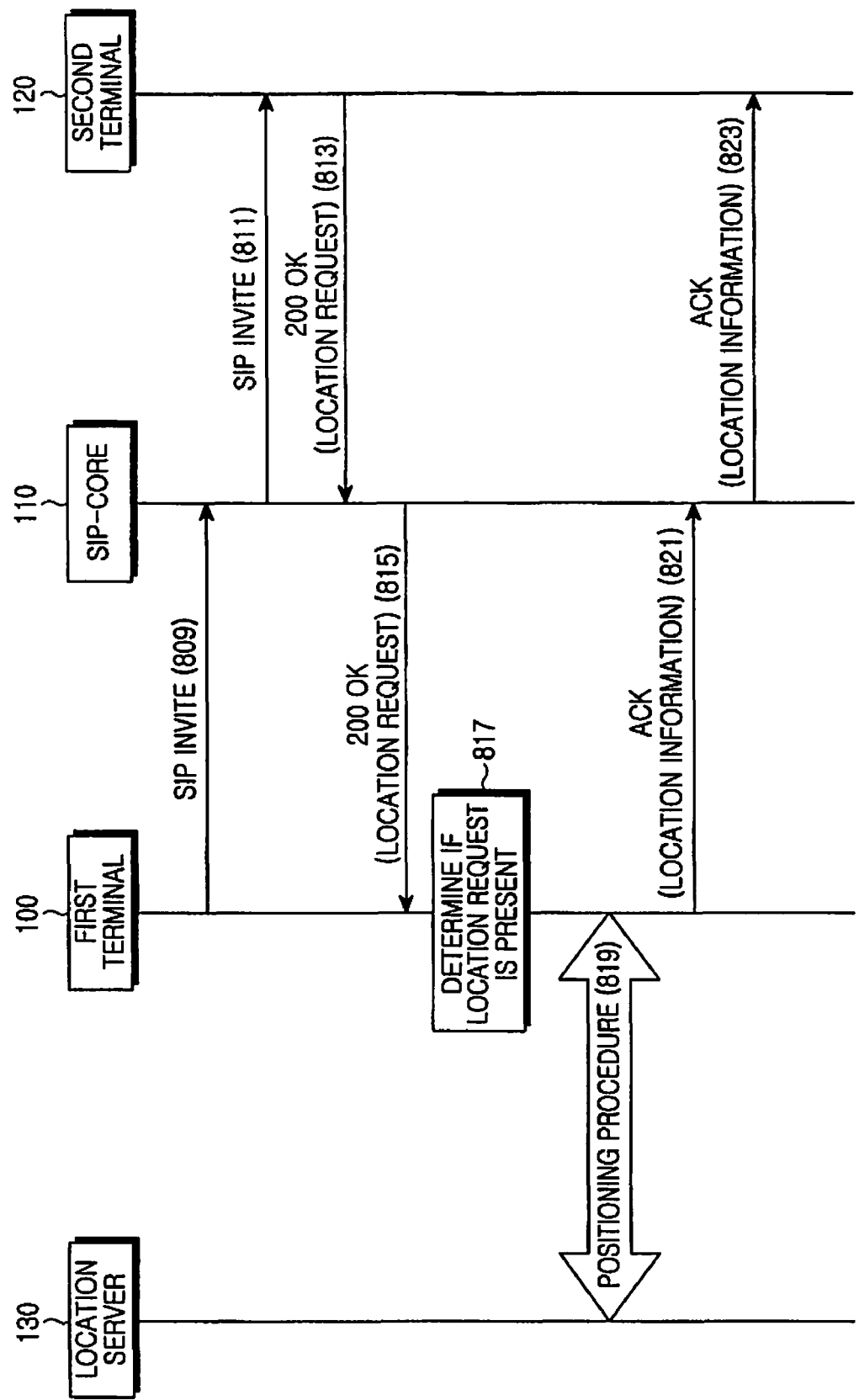
FIG. 7 is a flow diagram illustrating SIP messages transmitted/received between entities for providing location information according to a seventh embodiment of the present invention.

In the seventh embodiment of the present invention, the callee requests the caller to provide location information of the caller, and then receives the requested location information, which will be described with reference to FIG. 7. FIG. 7 shows a case where the second terminal 120 corresponding to a callee receiving an SIP INVITE makes a request for location information of the first terminal 100, and then the first terminal 100 transfers its own location information to the second terminal 120 through an ACK message.

Referring to FIG. 7, the first terminal 100 transfers the SIP INVITE to the second terminal 120 via the SIP core 110 in steps 809 and 811. In this case, the SIP INVITE is a message generally used for SIP session connection.

After receiving the SIP INVITE, the second terminal 120 authenticates the first terminal 100 and performs its authorization. In steps 813 and 815, the second terminal 120 transmits a 200 OK message, indicating that a corresponding SIP session request is allowed, via the SIP core 110 to the first terminal 100. In this case, the second terminal 120 inserts contents, regarding location information request of the first terminal 100, into a body part of the 200 OK message and then transmits the resulting message.

In step 817, the first terminal 100 determines if the 200 OK message includes a location request. As a result of the determination in step 817, when the 200 OK message includes the location request, the first terminal 100 determines if the pre-stored the location information of its own is present. In contrast, when the location information of its own is absent within the terminal, the first terminal 100 calculates location information by performing a positioning procedure after being connected to the location server 130 in step 819. In steps 821 and 823, the first terminal 100 loads the location information of its own on the ACK message and then transfer the ACK message via the SIP core 110 to the second terminal 120.

Hereinafter, a case where an SIP MESSAGE or an SIP INFO is used to request and transfer location information between the first terminal 100 and the second terminal 120 will be described.

In an eighth embodiment of the present invention, the first terminal 100 corresponding to the caller makes a request for location information of the second terminal 120 corresponding to the callee, and then receives the requested location information, which will be described with reference to FIG. 8.

Figure 8:
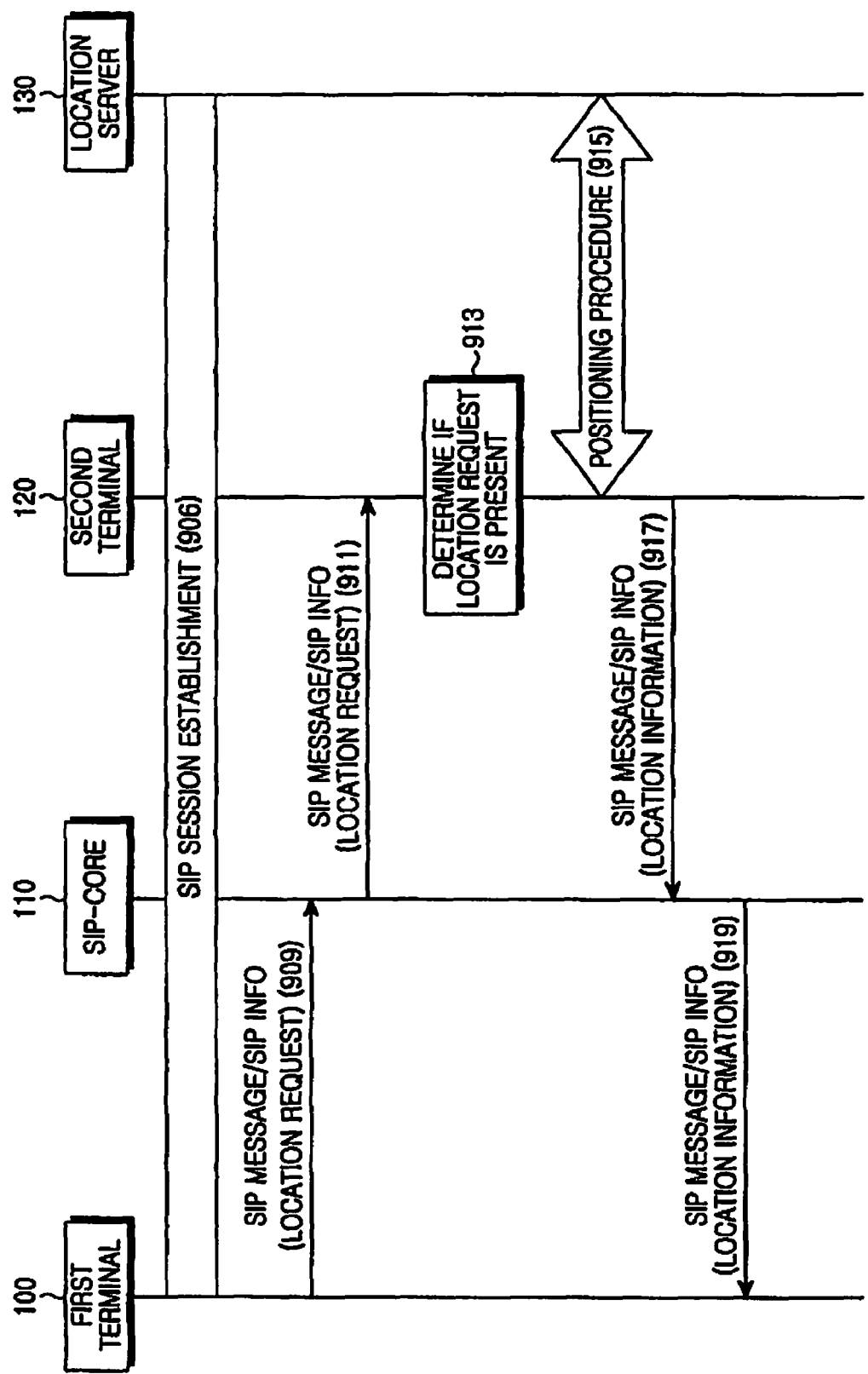
FIG. 8 is a flow diagram illustrating SIP messages transmitted/received between entities for providing location information according to an eighth embodiment of the present invention.

Step 906 of FIG. 8 is in a state where an SIP session has been established between the first terminal 100 and the second terminal 120. When location information is requested or received by using an SIP MESSAGE, it is possible to exchange the SIP MESSAGE under non-SIP session establishment. However, in order to transfer an SIP INFO between the first terminal 100 and the second terminal 120, an SIP session should be previously established.

In a state where the SIP session has been previously established, the first terminal 100 loads a location request on the SIP MESSAGE or the SIP INFO and then transfers the resulting message via the SIP core 110 to the second terminal 120. In step 913, the second terminal 120 determines if the SIP MESSAGE or the SIP INFO includes a location request. As a result of the determination in step 913, when the SIP MESSAGE or the SIP INFO includes the location request, the second terminal 120 proceeds to step 915. Steps 915 to 919 are identical to steps 219 to 223 of FIG. 1, so the detailed description thereof is omitted.

In a ninth embodiment of the present invention, the second terminal 120 corresponding to the callee makes a request for location information of the first terminal 100 corresponding to the caller, and receives the requested location information, which will be described with reference to FIG. 9.

Figure 9:
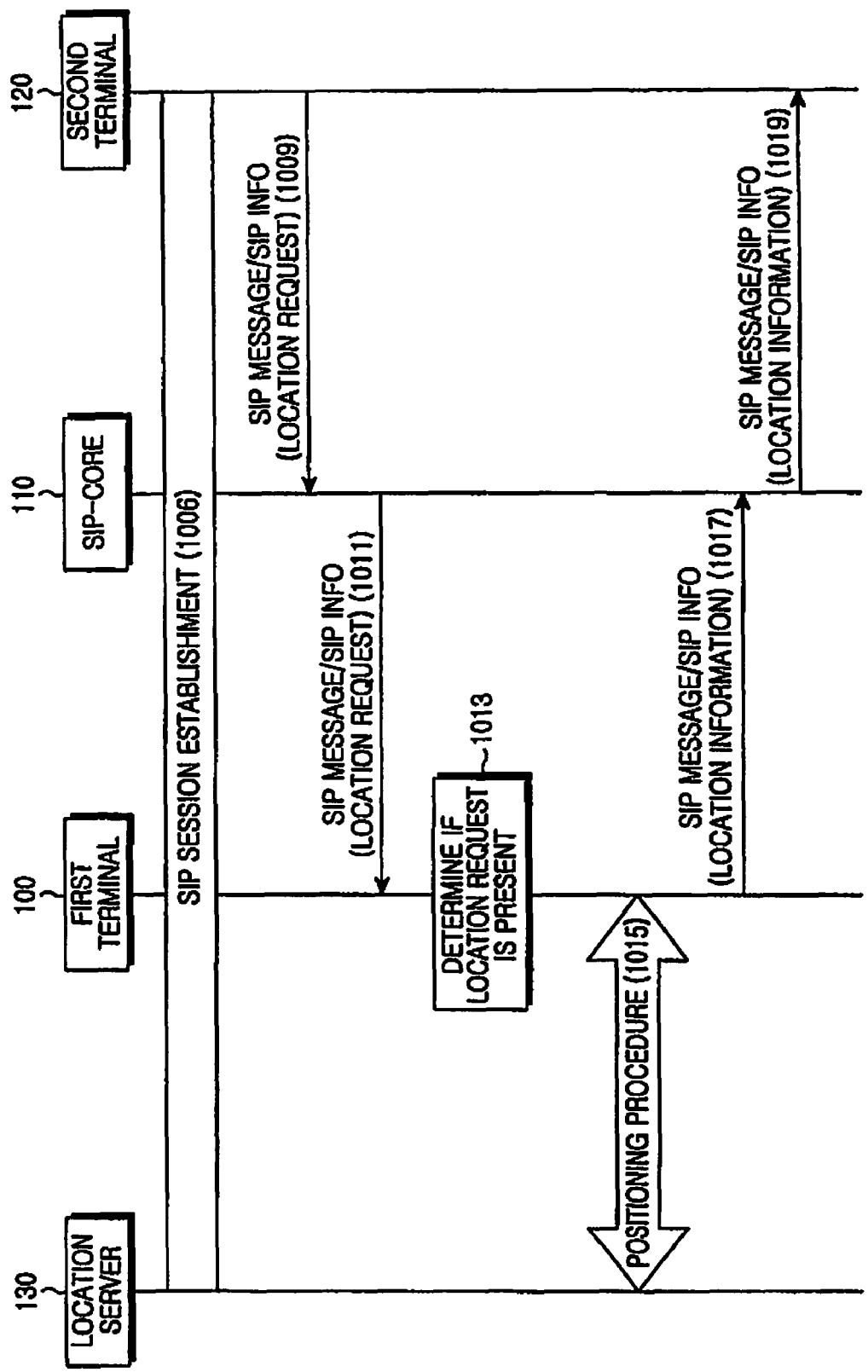
FIG. 9 is a flow diagram illustrating SIP messages transmitted/received between entities for providing location information according to a ninth embodiment of the present invention.

Step 1006 of FIG. 9 is also in a state where an SIP session has been established between the first terminal 100 and the second terminal 120, as in the case of step 906 of FIG. 8. In FIG. 9, only a target for requesting and receiving location information is given to be different from that of FIG. 8. However, request and transfer of location information are accomplished through the SIP MESSAGE or the SIP INFO, as in the case of FIG. 8, so the detailed description for steps 1009 to 1019 is omitted.

Figure 10:
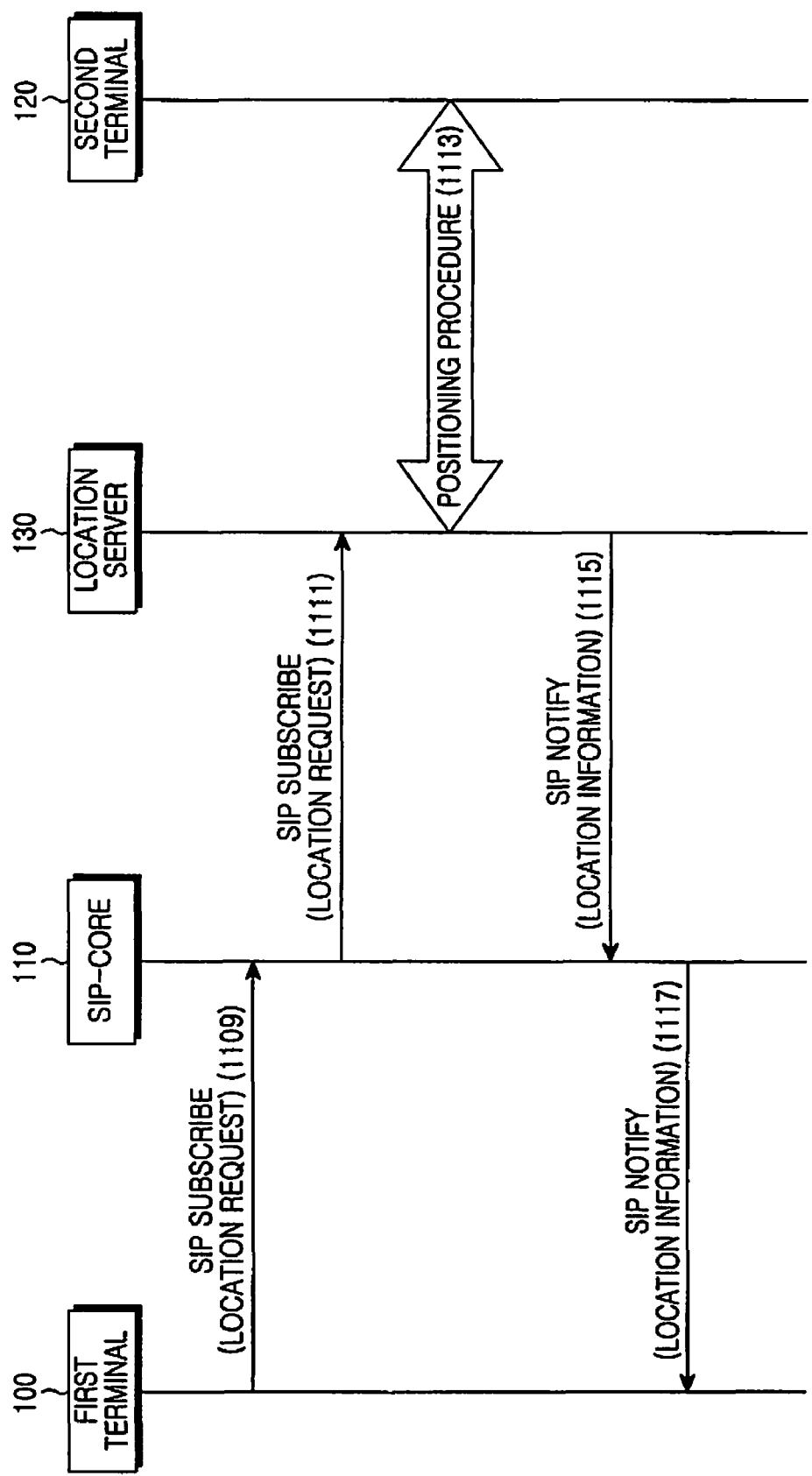
FIG. 10 is a flow diagram illustrating SIP messages transmitted/received between entities for providing location information according to a tenth embodiment of the present invention.

In a tenth embodiment of the present invention, a description is made of a case of using an SIP message capable of requesting and transferring location information without an SIP session connection, that is, call inter-working, from among SIP messages used for data transfer other than an SIP session connection. Such SIP messages include an SIP SUBSCRIBE and an SIP NOTIFY. FIG. 10 shows a case where the SIP SUBSCRIBE and the SIP NOTIFY are used for request and transfer of the location information.

Referring to FIG. 10, the first terminal 100 transmits the SIP SUBSCRIBE to the SIP core 110 in step 1109. In this case, the SIP SUBSCRIBE includes contents regarding the request of the location information of the second terminal 120. Then, the SIP core 110 transmits the SIP SUBSCRIBE to the location server 130 instead of directly transferring the SIP SUBSCRIBE to the second terminal 120. It is assumed that the location server 130 knows an SIP in order to exchange the SIP messages with the SIP core 110.

After receiving the SIP SUBSCRIBE, the location server 130 determines if the SIP SUBSCRIBE includes the location request. As a result of the determination, when the SIP SUBSCRIBE includes the location request, the location server 130 performs a positioning procedure together with the second terminal 120 in step 1113. By performing the procedure, when the location information of the second terminal 120 is calculated, the location server 130 inserts the calculated location information into the SIP NOTIFY and then transmits the resulting location request to the SIP core 110 in step 1115. In step 1117, the SIP core 110 transfers the SIP NOTIFY to the first terminal 100.

According to the present invention as described above, it is possible to request and transfer location information based on an SIP by modification of SIP methods used for an SIP session.

The present invention has advantages in that location services are provided together with start of voice communication, such as real-time VoIP, by using an SIP. As such, it is possible to transfer location information during real-time VoIP through World Interoperability for Microwave Access (WIMAX) or a Wireless LAN (WLAN) in the future. Also, on an emergency situation, it is possible to make a call to an emergency assistance center simultaneously while transferring location information, so that proper emergency services may be accomplished. According to the present invention, a combination of communication with location information may help development of existing multi-media services.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A system for providing location information of a terminal by using a Session Initiation Protocol (SIP), comprising:
   a first terminal for transmitting a SIP message for call connection;
   a second terminal for determining if the SIP message includes a location request when the SIP message for call connection is received from the first terminal, and transmitting a response message including location information of the second terminal when the received SIP message includes the location request;
   a SIP core for transferring the SIP message for call connection from the first terminal to the second terminal, and transferring the response message from the second terminal to the first terminal; and
   a location server for performing a positioning procedure together with the second terminal and calculating location information of the second terminal,
   wherein the second terminal determines if pre-stored location information of the second terminal is present when the received SIP message includes the location request, and transmits the response message including the pre-stored location information of the second terminal when the pre-stored location information of the second terminal is found,
   wherein the second terminal requests the location server to calculate location information and acquires the calculated location information from the location server when the pre-stored location information of the second terminal is not found.

2. The system as claimed in claim 1, wherein the SIP message for call connection is a SIP INVITE, and the response message is one of a 200 OK message and an Acknowledgement (ACK) message.

3. A system for providing location information, comprising:
   a first terminal for transmitting a Session Initiation Protocol SIP message for call connection including a location request;
   a second terminal for establishing a session with the first terminal, and
   transmitting a transmission message including location information of the second terminal on the established session to the first terminal when the SIP message for call connection is received, and
   a location server for performing a positioning procedure together with the second terminal and calculating location information of the second terminal,
   wherein the second terminal determines if pre-stored location information of the second terminal is present when the received SIP message includes the location request, and transmits a response message including the pre-stored location information of the second terminal when the pre-stored location information of the second terminal is found, and
   wherein the second terminal requests the location server to calculate location information and acquires the calculated location information from the location server when the pre-stored location information of the second terminal is not found.

4. The system as claimed in claim 3, wherein the second terminal transmits a 200 OK message indicating acceptance of the SIP message for call connection and establishes a session with the first terminal, and then transmits one of a SIP MESSAGE and a SIP INFO including location information of the second terminal.

5. The system as claimed in claim 3, wherein the second terminal transmits the 200 OK message indicating acceptance of the SIP message for call connection and establishes a session with the first terminal, and then transmits a Message Session Relay Protocol (MSRP) based message including the location information of the second terminal.

6. A system for providing location information, comprising:
   a first terminal for transmitting a message including location information of the first terminal to a second terminal when a response message is received from the second terminal, wherein the message is to be transmitted on a session;
   the second terminal for transmitting the response message including a location request, with respect to a Session Initiation Protocol (SIP) message for call connection; and
   a location server for performing a positioning procedure together with the second terminal and calculating location information of the second terminal,
   wherein the second terminal determines if pre-stored location information of the second terminal is present when the received SIP message includes the location request, and transmits the response message including the pre-stored location information of the second terminal when the pre-stored location information of the second terminal is found, and
   wherein the second terminal requests the location server to calculate location information and acquires the calculated location information from the location server when the pre-stored location information of the second terminal is not found.

7. The system as claimed in claim 6, wherein the first terminal transmits an Acknowledgement (ACK) message including the location information of the first terminal to the second terminal.

8. The system as claimed in claim 6, wherein the first terminal transmits one of a SIP MESSAGE and a SIP INFO including the location information of the first terminal to the second terminal.

9. A system for providing location information, comprising:
   a first terminal for transmitting a Session Initiation Protocol (SIP) message for call connection including location information of the first terminal;
   a second terminal for receiving the SIP message for call connection and acquiring the location information of the first terminal and
   a location server for performing a positioning procedure together with the second terminal and calculating location information of the second terminal,
   wherein the second terminal determines if pre-stored location information of the second terminal is present when the received SIP message includes a location request, and transmits a response message including the pre-stored location information of the second terminal when the pre-stored location information of the second terminal is found, and
   wherein the second terminal requests the location server to calculate location information and acquires the calculated location information from the location server when the pre-stored location information of the second terminal is not found.

10. A method for providing location information of a terminal by using a Session Initiation Protocol (SIP), comprising:
   transmitting, by a first terminal, a SIP message for call connection to a second terminal;
   determining, by the second terminal, if a received SIP message includes a location request;
   transmitting a response message including location information of the second terminal to the first terminal when the received SIP message includes the location request,
   determining, by the second terminal, if pre-stored location information of the second terminal is found when the received SIP message includes the location request; and
   when the pre-stored location information of the second terminal is found, transmitting the response message including the location information of the second terminal;
   requesting a location server to calculate location information when the pre-stored location information of the second terminal is not found; and
   acquiring the calculated location information from the location server.

11. The method as claimed in claim 10, wherein the SIP message for call connection is a SIP INVITE, and the response message is one of a 200 OK message or an Acknowledgement (ACK) message.

12. A method for providing location information, comprising:
   transmitting, by a first terminal, a Session Initiation Protocol (SIP) message for call connection including a location request to a second terminal;
   transmitting, by the second terminal, a response message to the first terminal and establishing a session;
   transmitting, by the second terminal, a message including location information of the second terminal to the first terminal, wherein the message is to be transmitted on the established session;
   when the second terminal finds pre-stored location information of the second terminal, transmitting the response message including the location information of the second terminal;
   calculating, by a location server, location information when the pre-stored location information of the second terminal is not found; and
   acquiring the calculated location information.

13. The method as claimed in claim 12, wherein the second terminal transmits one of a SIP MESSAGE and a SIP INFO including the location information of the second terminal.

14. The method as claimed in claim 12, wherein the second terminal transmits a Message Session Relay Protocol (MSRP) based message including the location information of the second terminal.

15. A method for providing location information of a terminal by using a Session Initiation Protocol (SIP), comprising :
   transmitting, by a first terminal, a SIP message for call connection to a second terminal;
   receiving, by the first terminal, a first response message with respect to the SIP message for call connection from the second terminal;
   determining if the received response message includes a location request;
   transmitting a second response message including the location request of the first terminal to the second terminal when the received response message includes the location request;
   when the second terminal finds pre-stored location information of the second terminal, transmitting the second response message including the location information of the second terminal;
   calculating, by a location server, location information when pre-stored location information of the second terminal is not found; and
   acquiring the calculated location information.

16. The method as claimed in claim 15, wherein the SIP message for call connection with respect to the first response message is a 200 OK message, and the second response message including the location information is an Acknowledgement (ACK) message.

17. A method for providing location information, comprising:
   transmitting, by a first terminal, a Session Initiation Protocol (SIP) message for call connection to a second terminal;
   transmitting, by the second terminal, a response message to the first terminal, and-establishing a session;
   transmitting, by the first terminal, a message including a location request to the second terminal, wherein the message is to be transmitted on the established session;
   transmitting, by the second terminal, another message including the location information to the first terminal, wherein the other message is to be transmitted on the established session;
   when the second terminal finds pre-stored location information of the second terminal, transmitting the response message including the location information of the second terminal;
   calculating, by a location server, location information when the pre-stored location information of the second terminal is not found; and
   acquiring the calculated location information.

18. The method as claimed in claim 17, wherein the message transmitted on the established session is one of a Message Session Relay Protocol (MSRP) based message, a SIP MESSAGE, and a SIP INFO.

19. A method for providing location information, comprising:
   transmitting, by a first terminal, a Session Initiation Protocol (SIP) message for call connection to a second terminal;
   transmitting, by the second terminal, a response message to the first terminal, and establishing a session;
   transmitting, by the second terminal, a message including a location request to the first terminal, wherein the message is to be transmitted on the established session;
   transmitting, by the first terminal, another message including the location information to the second terminal, wherein the other message is to be transmitted on the established session;
   when the second terminal finds pre-stored location information of the second terminal, transmitting the response message including the location information of the second terminal;
   calculating, by a location server, location information when the pre-stored location information of the second terminal is not found; and
   acquiring the calculated location information.

20. The method as claimed in claim 19, wherein the message transmitted on the established session is one of a Message Session Relay Protocol (MSRP) based message, a SIP MESSAGE, and a SIP INFO.

* * * * *